US006766295B1

United States Patent
Murveit et al.

(10) Patent No.: US 6,766,295 B1
(45) Date of Patent: *Jul. 20, 2004

(54) ADAPTATION OF A SPEECH RECOGNITION SYSTEM ACROSS MULTIPLE REMOTE SESSIONS WITH A SPEAKER

(75) Inventors: Hy Murveit, Portola Valley, CA (US); Ashvin Kannan, Redwood City, CA (US)

(73) Assignee: Nuance Communications, Menlo Park, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/309,211

(22) Filed: May 10, 1999

(51) Int. Cl.[7] .............................................. G10L 15/06

(52) U.S. Cl. ..................... 704/243; 704/244; 379/88.01

(58) Field of Search ................................ 704/243, 244, 704/245, 246; 379/88.01, 88.02

(56) References Cited

U.S. PATENT DOCUMENTS

| | | | |
|---|---|---|---|
| 4,489,434 A | | 12/1984 | Moshier ....................... 381/43 |
| 4,590,604 A | * | 5/1986 | Feilchenfeld ................ 704/272 |
| 4,866,778 A | | 9/1989 | Baker .......................... 381/43 |
| 5,127,055 A | * | 6/1992 | Larkey ........................ 704/244 |
| 5,208,897 A | | 5/1993 | Hutchins ....................... 395/2 |
| 5,239,586 A | | 8/1993 | Marui .......................... 381/47 |
| 5,293,452 A | | 3/1994 | Picone et al. ............... 395/2.59 |
| 5,528,731 A | * | 6/1996 | Sachs et al. ................. 704/246 |
| 5,568,540 A | | 10/1996 | Greco et al. .............. 379/88.25 |

(List continued on next page.)

FOREIGN PATENT DOCUMENTS

| | | | |
|---|---|---|---|
| EP | 0 651 372 A2 | 5/1995 | ............. G10L/5/06 |
| EP | 1 022 725 A1 | 7/2000 | ........... G10L/17/00 |
| JP | 10079785 | 3/1998 | ............ H04M/1/57 |

OTHER PUBLICATIONS

Reynolds et al.; Integration of speaker and speech recognition systems; IEEE; pp. 869–872 vol. 2.*

(List continued on next page.)

Primary Examiner—Richemond Dorvil
Assistant Examiner—Abul K. Azad
(74) Attorney, Agent, or Firm—Haverstock & Owens LLP

(57) ABSTRACT

A technique for adaptation of a speech recognizing system across multiple remote communication sessions with a speaker. The speaker can be a telephone caller. An acoustic model is utilized for recognizing the speaker's speech. Upon initiation of a first remote session with the speaker, the acoustic model is speaker-independent. During the first session, the speaker is uniquely identified and speech samples are obtained from the speaker. In the preferred embodiment, the samples are obtained without requiring the speaker to engage in a training session. The acoustic model is then modified based upon the samples thereby forming a modified model. The model can be modified during the session or after the session is terminated. Upon termination of the session, the modified model is then stored in association with an identification of the speaker. During a subsequent remote session, the speaker is identified and, then, the modified acoustic model is utilized to recognize the speaker's speech. Additional speech samples are obtained during the subsequent session and, then, utilized to further modify the acoustic model. In this manner, an acoustic model utilized for recognizing the speech of a particular speaker is cumulatively modified according to speech samples obtained during multiple sessions with the speaker. As a result, the accuracy of the speech recognizing system improves for the speaker even when the speaker only engages in relatively short remote sessions.

55 Claims, 5 Drawing Sheets

U.S. PATENT DOCUMENTS

| | | | | |
|---|---|---|---|---|
| 5,617,486 A | * | 4/1997 | Chow et al. | 382/181 |
| 5,651,054 A | | 7/1997 | Dunn et al. | 379/67 |
| 5,717,743 A | * | 2/1998 | McMahan et al. | 379/188 |
| 5,742,905 A | | 4/1998 | Pepe et al. | 455/461 |
| 5,778,338 A | | 7/1998 | Jacobs et al. | 704/223 |
| 5,794,192 A | * | 8/1998 | Zhao | 704/244 |
| 5,799,065 A | | 8/1998 | Junqua et al. | 379/88 |
| 5,822,405 A | | 10/1998 | Astarabadi | 379/88 |
| 5,842,161 A | * | 11/1998 | Cohrs et al. | 704/251 |
| 5,848,130 A | | 12/1998 | Rochkind | 379/67 |
| 5,897,616 A | * | 4/1999 | Kanevsky et al. | 704/246 |
| 6,044,346 A | | 3/2000 | Ali et al. | 704/270 |
| 6,070,140 A | | 5/2000 | Tran | 704/275 |
| 6,151,571 A | | 11/2000 | Pertrushin | 704/209 |
| 6,181,780 B1 | | 1/2001 | Finnigan | 379/67.1 |
| 6,185,535 B1 | | 2/2001 | Hedin et al. | 704/270 |
| 6,208,713 B1 | | 3/2001 | Rahrer et al. | 379/67.1 |
| 6,219,407 B1 | | 4/2001 | Kanevsky et al. | 379/88.02 |
| 6,275,806 B1 | | 8/2001 | Pertrushin | 704/272 |
| 6,327,343 B1 | | 12/2001 | Epstein et al. | 379/88.01 |
| 6,334,103 B1 | | 12/2001 | Surace et al. | 704/257 |
| 6,363,348 B1 | * | 3/2002 | Besling et al. | 704/270.1 |

OTHER PUBLICATIONS

"Integration Of Speaker And Speech Recognition Systems" D.A. Reynolds and L. P. Heck, 1991, pp. 869–872, IEEE.

"A Fast Algorithm For Unsupervised Incremental Speaker Adaption" Michael Schubler, Florian Gallwitz, Stefan Harbeck, Apr. 21, 1997, pp. 1019–1022, IEEE.

"Iterative Self–Learning Speaker And Channel Adaptation Under Various Initial Conditions" Yunxin Zhao, May 9, 1995, pp. 712–715, IEEE.

"Vector–Field–Smoothed Bayesian Learning For Fast And Incremental Speaker/Telephone–Channel Adaption" Jun–ichi Takahashi And Shigeki Sagayama, 1997, pp. 127–146, Computer Speech And Language.

* cited by examiner

ADAPTATION OF A SPEECH RECOGNITION SYSTEM ACROSS MULTIPLE REMOTE SESSIONS WITH A SPEAKER

FIELD OF THE INVENTION

The present invention relates to the field of speech recognition. More particularly, the present invention relates to the field of adaptation of a speech recognition system across multiple remote sessions with a speaker.

BACKGROUND OF THE INVENTION

Speech recognition systems are known which permit a user to interface with a computer system using spoken language. The speech recognition system receives spoken input from the user, interprets the input, and then translates the input into a form that the computer system understands.

Speech recognition systems typically recognize spoken words or utterances based upon an acoustic model of a person who is speaking (the speaker). Acoustic models are typically generated based upon samples of speech. When the acoustic model is constructed based upon samples of speech obtained from a number of persons rather than a specific speaker, this is called speaker-independent modeling. When a speaker-independent model is then modified for recognizing speech of a particular person based upon samples of that person's speech, this is called adaptive modeling. When a model is constructed based solely on the speech of a particular person, this is termed speaker-dependent modeling.

Speaker-independent modeling generally enables a number of speakers to interface with the same recognition system without having obtained prior samples of the speech of the particular speakers. In comparison to speaker-independent modeling, adaptive modeling and speaker-dependent modeling generally enable a speech recognition system to more accurately recognize a speaker's speech, especially if the speaker has a strong accent, has a phone line which produces unusual channel characteristics or for some other reason is not well modeled by speaker independent models.

FIG. 1 illustrates a plurality of speaker-dependent acoustic models $M_1$, $M_2$, and $M_n$, in accordance with the prior art. For each speaker, 1 through n, a corresponding speaker-dependent acoustic model $M_1$ through $M_n$, is stored. Thus, speech 10 of speaker 1 is recognized using the model $M_1$ and the results 12 are outputted. Similarly, speech 14 of speaker 2 is recognized using the model $M_2$ and the results 16 are outputted. And, speech 18 of speaker n is recognized using the model $M_n$ and the results are outputted.

A speech recognition application program called NaturallySpeaking™, which adapts to a particular user, is available from Dragon Systems, Inc. This application program enables a user to enter text into a written document by speaking the words to be entered into a microphone attached to the user's computer system. The spoken words are interpreted and translated into typographical characters which then appear in the written document displayed on the user's computer screen. To adapt the application program to the particular user and to background noises of his or her environment, the user is asked to complete two initial training sessions during which the user is prompted to read textual passages aloud. A first training session requires that the user read several paragraphs aloud, while a second training session requires 25 to 30 to minutes for speaking and 15 to 20 minutes for processing the speech.

Other speech recognition systems are known which adapt to an individual speaker based upon samples of speech obtained while the speaker is using the system, without requiring a training session. The effectiveness of this type of adaptation, however, is diminished when only a small sample of speech is available.

Speech recognition systems are known which provide a telephonic interface between a caller and a customer service application. For example, the caller may obtain information regarding flight availability and pricing for a particular airline and may purchase tickets utilizing spoken language and without requiring assistance from an airline reservations clerk. Such customer service applications are typically intended to be accessed by a diverse population of callers and with various background noises. In such applications, it would be impractical to ask the callers to engage in a training session prior to using the customer service application. Accordingly, an acoustic model utilized for such customer service applications must be generalized so as to account for variability in the speakers. Thus, speaker-independent modeling is utilized for customer service applications. A result of using speaker-independent modeling is that the recognition system is less accurate than may be desired. This is particularly true for speakers with strong accents and those who have a phone line which produces unusual channel characteristics.

Therefore, what is needed is a technique for improving the accuracy of speech recognition for a speech recognition system.

SUMMARY OF THE INVENTION

The invention is a method and apparatus for adaptation of a speech recognition system across multiple remote sessions with a speaker. The speaker can remotely access a speech recognition system, such as via a telephone or other remote communication system. An acoustic model is utilized for recognizing speech utterances made by the speaker. Upon initiation of a first remote session with the speaker, the acoustic model is speaker-independent. During the first remote session, the speaker is uniquely identified and speech samples are obtained from the speaker. In the preferred embodiment, the samples are obtained without requiring the speaker to engage in a training session. The acoustic model is then modified based upon the samples thereby forming a modified model. The model can be modified during the remote session or after the session is terminated. Upon termination of the remote session, the modified model is then stored in association with an identification of the speaker. Alternately, rather than storing the modified model, statistics that can be used to modify a pre-existing acoustic model are stored in association with an identification of the speaker.

During a subsequent remote session, the speaker is identified and, then, the modified acoustic model is utilized to recognize speech utterances made by the speaker. Additional speech samples are obtained during the subsequent session and, then, utilized to further modify the acoustic model. In this manner, an acoustic model utilized for recognizing the speech of a particular speaker is cumulatively modified according to speech samples obtained during multiple remote sessions with the speaker. As a result, the accuracy of the speech recognizing system improves for the speaker even when the speaker only engages in relatively short remote sessions.

For each speaker to remotely access the speech recognizing system, a modified acoustic model, or a set of statistics that can be used to modify the acoustic model or incoming acoustic speech, is formed and stored along with the speaker's unique identification. Accordingly, multiple different acoustic models or sets of statistics are stored, one for each speaker.

DETAILED DESCRIPTION OF A PREFERRED EMBODIMENT

Figure 2:
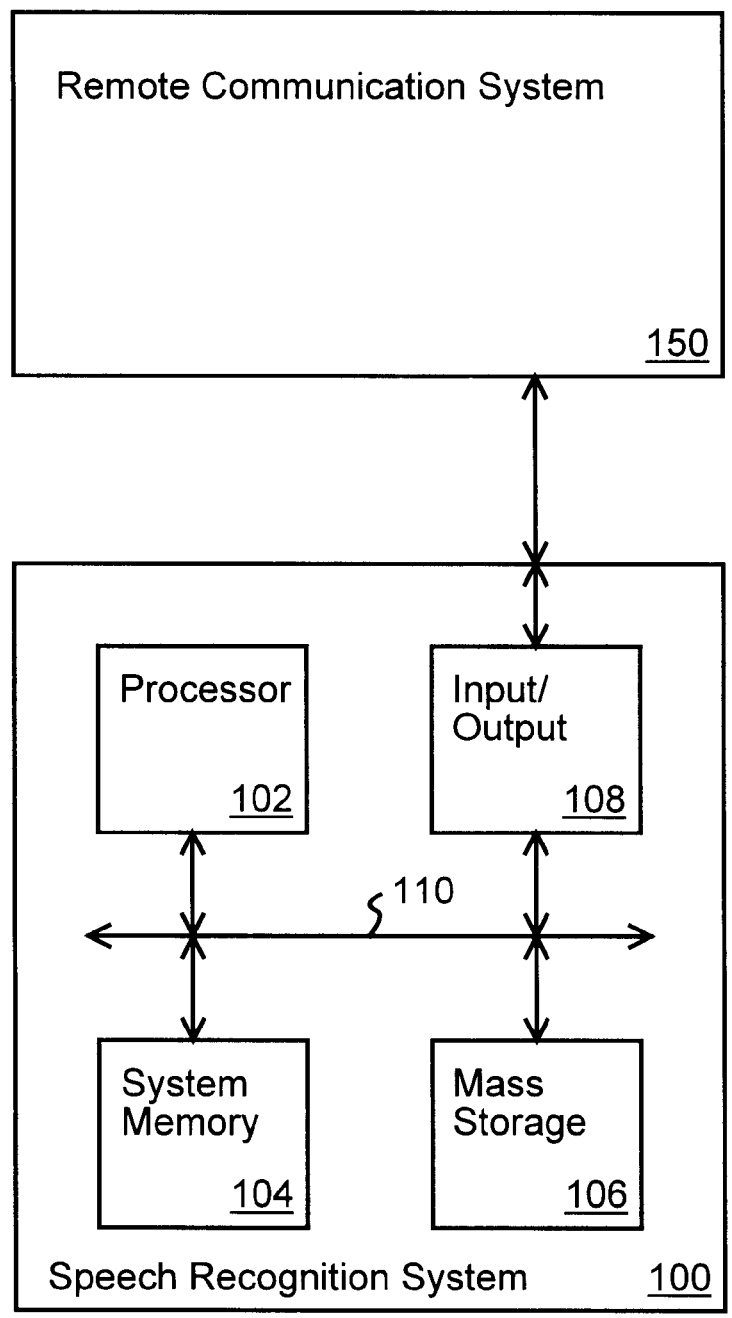
FIG. 2 illustrates a speech recognizing system in conjunction with a remote communication system in accordance with the present invention.

FIG. 2 illustrates a speech recognizing system 100 in conjunction with a remote communication system 150 in accordance with the present invention. The remote communication system 150 can be a telephone system (e.g., a central office, a private branch exchange or cellular telephone system). Alternately, the remote communication system 150 can be a communication network (e.g., a wireless network), a local area network (e.g., an Ethernet LAN) or a wide area network (e.g., the World Wide Web). The speech recognition system 100 includes a processing system, such as a general purpose processor 102, a system memory 104, a mass storage medium 106, and input/output devices 108, all of which are interconnected by a system bus 110. The processor 102 operates in accordance with machine readable computer software code stored in the system memory 104 and mass storage medium 106 so as to implement the present invention. The input/output devices 108 can include a display monitor, a keyboard and an interface coupled to the remote system 150 for receiving speech input therefrom. Though the speech recognizing system 100 illustrated in FIG. 2 is implemented as a general purpose computer, it will be apparent that the speech recognizing system can be implemented so as to include a special-purpose computer or dedicated hardware circuits. In which case, one or more of the hardware elements illustrated in FIG. 2 can be omitted or substituted by another.

Figure 3:
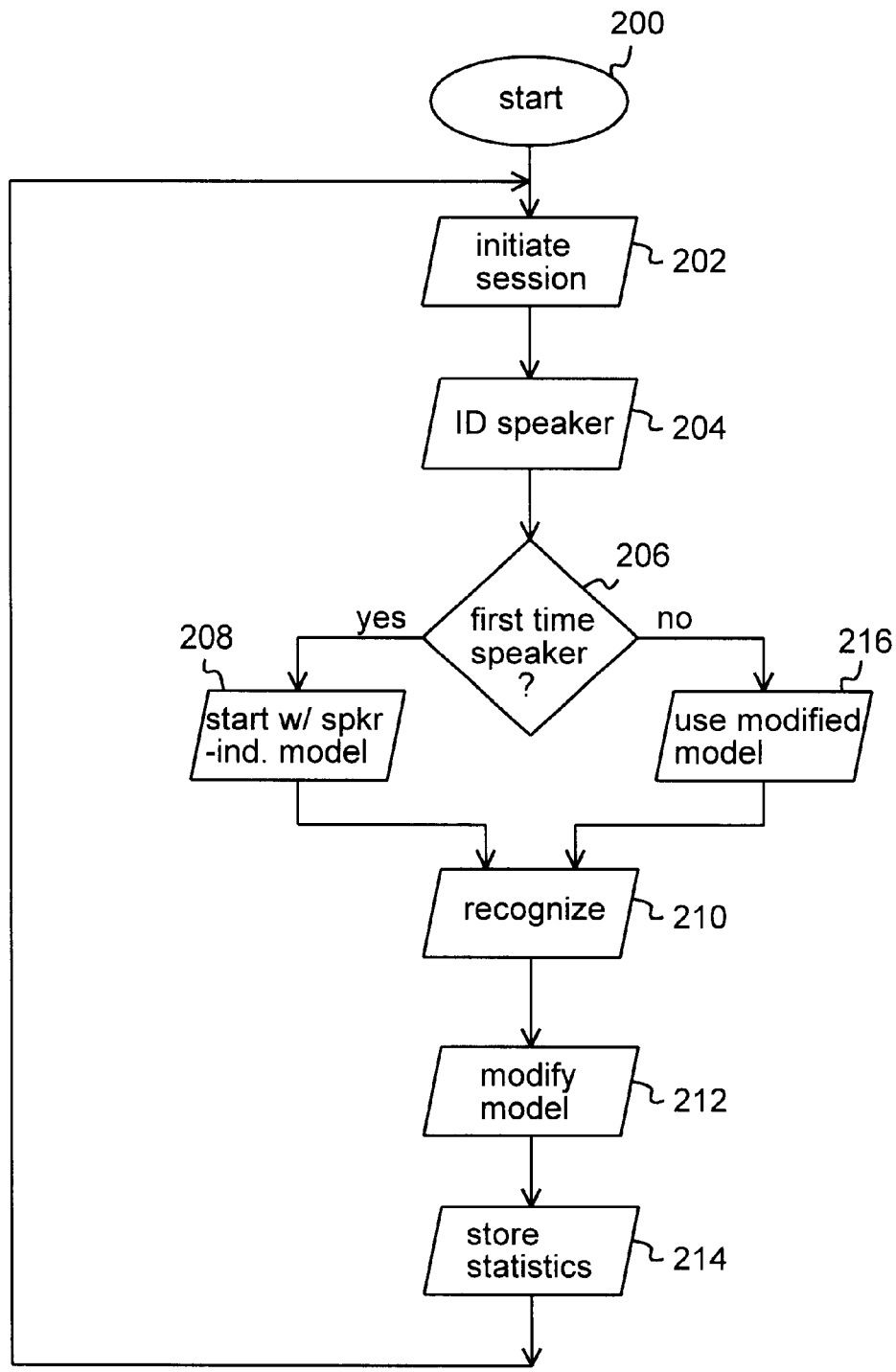
FIG. 3 illustrates a flow diagram for adapting an acoustic model utilized for speech recognition in accordance with the present invention.

The invention is a method and apparatus for adaptation of a speech recognizing system across multiple remote sessions with a speaker. FIG. 3 illustrates a flow diagram for adapting an acoustic model utilized for speech recognition in accordance with the present invention. The flow diagram of FIG. 3 illustrates graphically operation of the speech recognizing system 100 in accordance with the present invention. Program flow begins in a start state 200. From the state 200, program flow moves to a state 202. In the state 202, a remote session between the speaker and the voice recognition system 100 is initiated. For example, a telephone call placed by the speaker initiates the session; in which case, the speaker is a telephone caller. Alternately, the remote session is conducted via another remote communication medium. Then, program flow moves to a state 204.

In the state 204, an identification of the speaker is obtained. For example, the speaker can be prompted to speak his or her name, enter a personal identification number (pin), enter an account number, or the like. Alternately, the speaker can be automatically identified, such as by receiving the speaker's caller ID for a telephone call. The speaker's identification can also be authenticated utilizing voice identification techniques assuming a voice sample of the speaker has previously been obtained by the speech recognition system 100. From the state 204, program flow moves to a state 206. In the state 206, a determination is made as to whether the particular speaker is a first-time speaker or if samples of the speaker's speech have been previously obtained. This is accomplished by attempting to match the speaker's identification obtained in the state 204 to a prior entry stored in the memory 104 or mass storage 106 of the speech recognizing system 100 made in response to a prior session with the same speaker. It will be apparent that the prior entries can also be stored remotely from the speech recognition system 100, such as in a centralized database which is accessible to the speech recognition system 100 via a network connection which can be provided by a local area network or the World Wide Web.

Assuming the speaker is a first time speaker, program flow moves from the state 206 to a state 208. In the state 208, a speaker-independent model is retrieved from the memory 104 or mass storage 106 to be utilized for recognizing speech made by the speaker. The speaker-independent model is a generalized acoustic model generated based upon samples of speech taken from multiple different representative persons.

The program flow then moves to a state 210. In the state 210, the speaker-independent acoustic model retrieved in the state 208 is utilized for recognizing speech made by the speaker as the speaker interacts with the speech recognition system 100 during the remote session. For example, the speaker-independent model is utilized to recognize when the speaker wishes to obtain a flight schedule, a bank account balance, and so forth. In addition, during the state 210 samples of the speaker's speech are taken. Preferably, these samples are taken without prompting the speaker to speak certain words or phrases, as in a training session. It will be apparent, however, that the speaker can be prompted to speak certain words or phrases. In which case, prompting of the speaker is preferably performed so as to minimize inconvenience to the speaker.

Then program flow moves to a state 212. In the state 212, the speech recognition system 100 is modified. More particularly, the speaker-independent acoustic model utilized in the state 210 to recognize the speaker's speech is modified based upon the samples of the speaker's speech taken in the state 210, thereby forming a modified acoustic model.

In the preferred embodiment, the acoustic model is modified prior to termination of the remote session so that the modified model can immediately be put to use. Alternately, the acoustic model is modified after termination of the remote session. In the preferred embodiment, the acoustic model is modified and put to use for speech recognition during the first and subsequent remote sessions. The acoustic model can also be modified between remote sessions. Thus, the states 210 and 212 can be performed repeatedly, one after the other or concurrently, during a single session. For example, assuming a predetermined amount of speech (e.g., three seconds) is received (state 210), but the remote session has not yet been terminated, then the acoustic model can be modified (state 212) while a next predetermined amount of speech is received (state 210). Once the next predetermined amount of speech is received, the acoustic model is again modified (state 212). For simplicity of illustration, however, the states 210 and 212 are shown in FIG. 3 as occurring in a simple succession. Once the session terminates, program flow moves to a state 214.

In the state 214, a representation of the modified acoustic model, such as the modified model itself or a set of statistics that can be used to modify a pre-existing acoustic model or that can be used to modify incoming acoustic speech, is stored in the memory 104 or mass storage 106 or in a centralized network database. Note that rather than modifying an acoustic model, the present invention can be utilized to modify measurements of the speech such as features vectors to achieve the principle advantages of the present invention. It will be understood that modification of phonetic features is within the scope of the present invention and that use of the term "acoustic model" herein includes phonetic features.

Figure 4:
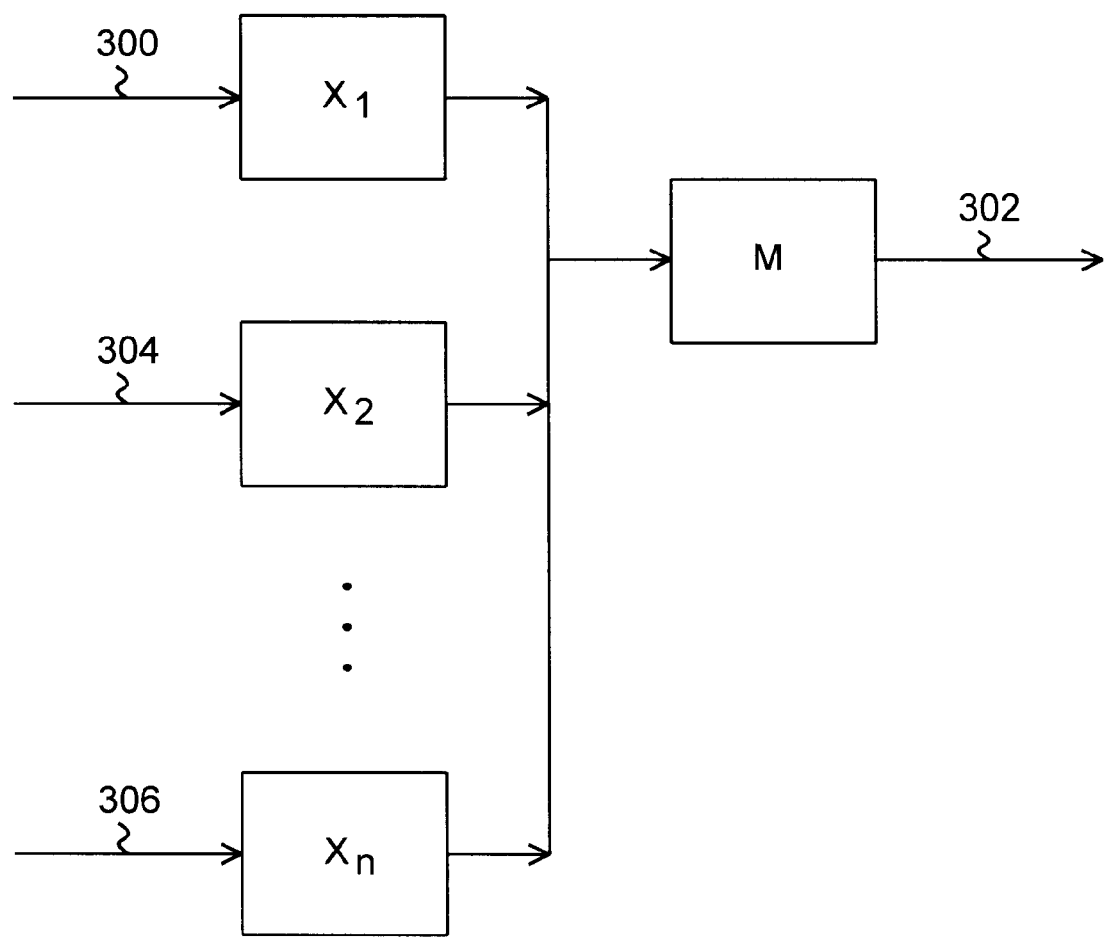
FIG. 4 illustrates a plurality of sets of transform statistics for use in conjunction with an acoustic model in accordance with the present invention.

Thus, in the preferred embodiment, only a set of statistics which can be used to modify a pre-existing acoustic model, is stored. For example, FIG. 4 illustrates a plurality of sets of transform statistics for use in conjunction with a pre-existing acoustic model M in accordance with the present invention. For each speaker, 1 through n, a corresponding set of statistics $X_1$, through $X_n$, is stored. For each speaker 1 through n, the modified model can be considered to include the corresponding set of statistics $X_1$ through $X_n$ together with the preexisting model M. Only one copy of pre-existing model M need be stored.

Figure 1:
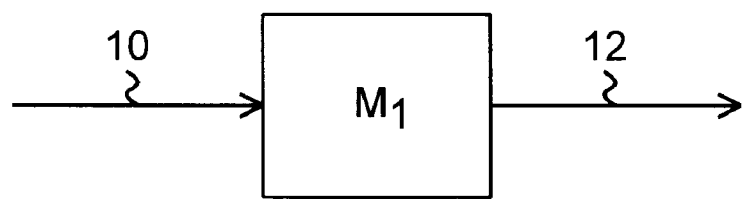
FIG. 1 illustrates a plurality of speaker-dependent acoustic models in accordance with the prior art.
Figure 1:
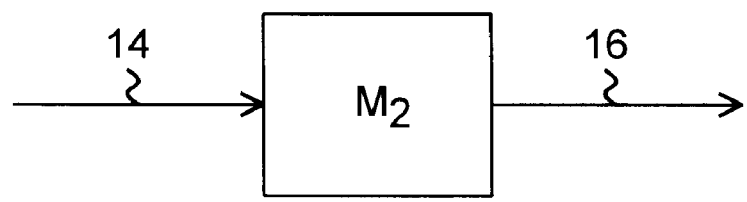
Figure 1:
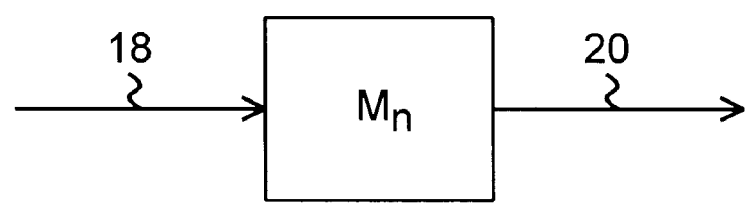

Thus, during a subsequent telephone session, speech 300 of speaker 1 is recognized using the corresponding set of transform statistics $X_1$ in conjunction with the pre-existing model M to recognize the speaker's speech for forming an output 302. Similarly, speech of speaker 2 is recognized using the corresponding set of statistics $X_2$ and the same pre-existing model M to recognize the speaker's speech for forming the output 302. And, speech of speaker n is recognized using the corresponding set of statistics $X_n$ and the model M to recognize the speaker's speech for forming an output 302. As a result, memory is conserved in comparison with the prior technique illustrated in FIG. 1.

The modified model, or set of statistics, is stored in association with the identification of the speaker for utilization for recognizing the speaker's speech in a subsequent session with the speaker. For example, assume that in the state 206, the speech recognition system 100 looks up the speaker's identification and determines that a sample of the speaker's speech has previously been obtained. In which case, program flow moves from the state 206 to a state 216.

In the state 216, the modified model or set of statistics stored in response to the speaker's previous remote session is retrieved from the memory 104 or mass storage 106 to be utilized for recognizing speech utterances made by the speaker during the current session. From the state 216, program flow then moves to the state 210. In the state 210, the modified acoustic model or set of statistics retrieved in the state 216 is utilized for recognizing speech utterances made by the speaker as the speaker interacts with the speech recognition system during the remote session. Additional samples of the speaker's speech are taken in the state 210 and utilized to further modify the acoustic model for the speaker.

In this manner, an acoustic model utilized for recognizing the speech of a particular speaker is cumulatively modified according to speech samples obtained during multiple remote sessions with the speaker. As a result, the accuracy of the speech recognizing system improves for the speaker across multiple remote sessions even when the remote sessions are of relatively short duration.

Figure 5:
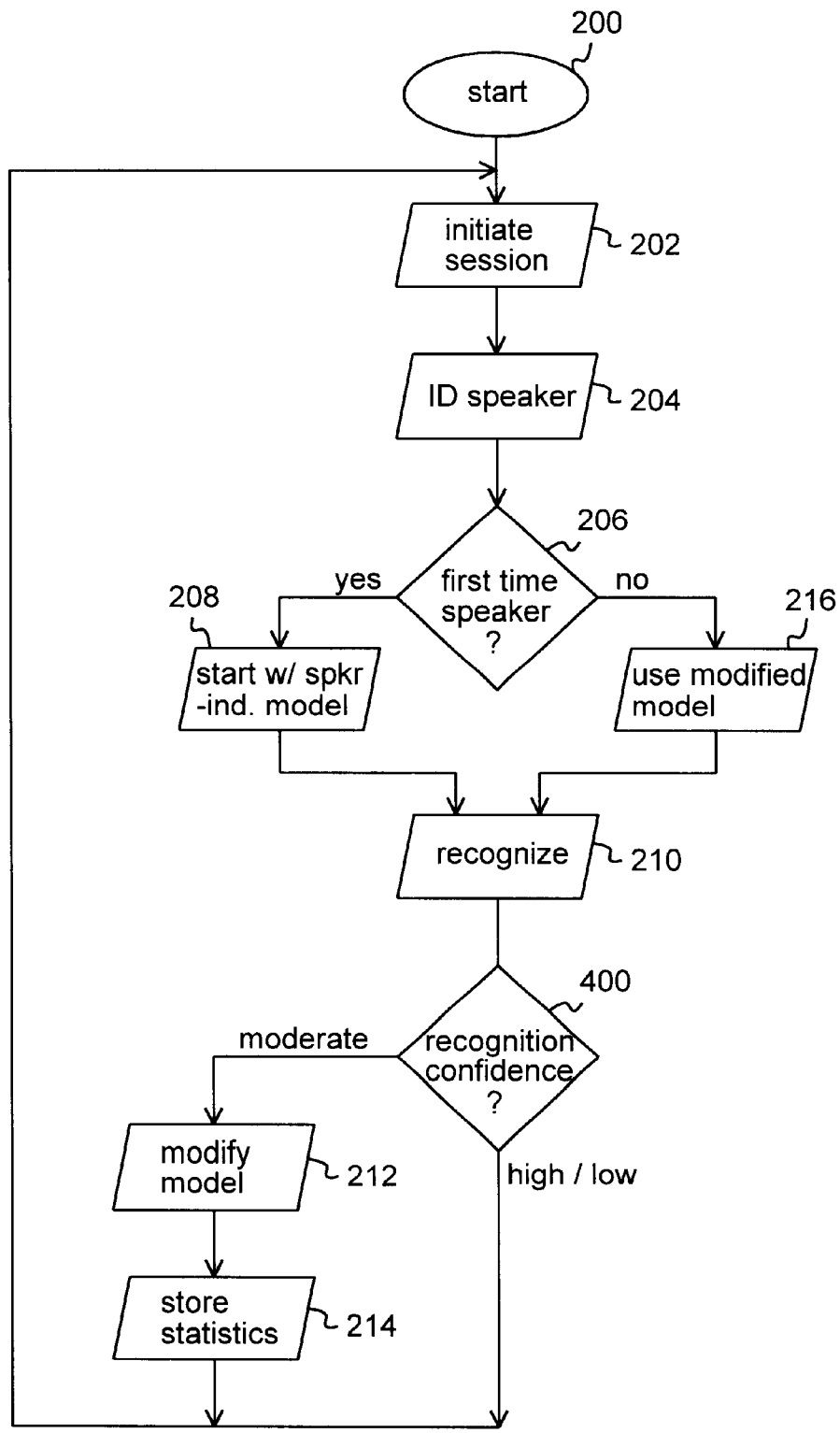
FIG. 5 illustrates a flow diagram for adapting an acoustic model utilized for speech recognition in accordance with an alternate embodiment of the present invention.

FIG. 5 illustrates a flow diagram for adapting an acoustic model utilized for speech recognition in accordance with an alternate embodiment of the present invention. The flow diagram of FIG. 5 illustrates graphically operation of the speech recognizing system 100 in accordance with an alternate embodiment of the present invention. Portions of FIG. 5 which have a one-to-one functional correspondence with those of FIG. 3 are given the same reference numeral and are not discussed further.

The flow diagram of FIG. 5 differs from that of FIG. 3 in that from the state 210, program flow moves to a state 400. In the state 400, a determination is made relative to the incoming speech utterance. This determination preferably assigns a confidence level related to the accuracy of the speech recognition performed in the state 210. This can be accomplished by the speech recognizing system 100 assigning each speech utterance, such as a word, a phoneme, a phrase or a sentence, a certainty or score, where the assigned certainty or score is related to the probability that the corresponding identified speech correctly corresponds to the spoken input, and, then, comparing the certainty or score to one or more predetermined thresholds. If the speech recognition confidence is consistently extremely high, there may be no need to modify (or further modify) the acoustic model for the particular speaker. By avoiding modification of the acoustic model, this saves processing capacity and memory of the speech recognition system 100 which can be devoted to other tasks. Conversely, if the speech recognition accuracy is extremely low, any modifications made to acoustic model based upon incorrectly recognized speech utterances or words is not expected to improve the accuracy of speech recognition based upon such a modified acoustic model. Accordingly, if the determination made in the state 400 suggests a high accuracy (e.g., the certainty exceeds a first threshold) or a low accuracy (e.g., the certainty is below a second threshold that is lower than the first threshold), then program flow returns to the state 202 upon termination of the remote session. In which case, no modifications to the acoustic model are performed.

Alternately, assuming the speech recognition accuracy is determined to be moderate (e.g, the certainty falls between the first and second thresholds), then it is expected that modifications to the acoustic model will improve accuracy. In which case, program flow moves from the state 400, to the state 212. As discussed relative to FIG. 3, in the state 212, the speaker-independent acoustic model utilized in the state 210 to recognize the speaker's speech is modified based upon the samples of the speaker's speech taken in the state 210, thereby forming a modified acoustic model.

In addition, because each portion of an utterance, such as a word or a phoneme, can be associated with a different confidence level, a single utterance can have several confidence levels associated with it. Thus, if some levels are above a threshold and others are below, only those portions having a confidence level above the threshold can be used to update the model.

Note that criteria other than, or in addition to, confidence levels can be utilized for making the determination in the state 400 of whether or not to modify the acoustic model. For example, a level of available resources in the speech recognition system 100, such as a low level of available memory or available processing power, may indicate that modification of the model is undesirable.

In the state 214, a representation of the modified acoustic model, such as the modified model itself or a set of statistics that can be used to modify a pre-existing acoustic model, is stored in the memory 104 or mass storage 106 or in a centralized network database in association with the identification of the speaker for utilization for recognizing the speaker's speech in a subsequent remote session with the speaker.

In an alternate embodiment, the determination made in the state 400 can be supervised. For example, the speech recognition system 100 can inform the speaker of the word or words it has recognized and, then, ask the speaker to verify whether the speaker's speech has been correctly recognized. Assuming the speaker confirms that the speaker's speech has been correctly recognized, then program flow moves from the state 400 to the state 212. Accordingly, the correctly identified speech utterances or words are utilized to modify the acoustic model. Conversely, if the speaker indicates that the speech utterances or words were incorrectly identified, then the acoustic model is not modified based upon such incorrectly identified speech utterances or words.

As described in relation to FIGS. 2–5, an acoustic model utilized for recognizing the speech of a particular speaker is cumulatively modified according to speech samples obtained during multiple remote sessions with the speaker. As a result, the accuracy of the speech recognizing system improves for the speaker across multiple remote sessions even when the sessions are of relatively short duration.

A feature of the present invention provides an acoustic model that uniquely corresponds to each of a plurality of speakers. During a first remote session with each of the speakers, the speaker-independent acoustic model is initially utilized. This model is then modified according to speech samples taken for each particular speaker. Preferably, the model is modified during the first and subsequent remote sessions and between sessions. Each modified model is then stored in association with the corresponding speaker's identification. For subsequent remote sessions, the speech recognizing system 100 retrieves an appropriate acoustic model from the memory 104 or mass storage 106 based upon the speaker's identification. Accordingly, each acoustic model is modified based upon samples of the corresponding speaker's speech across multiple remote sessions with the speaker.

To conserve memory, acoustic models that are specific to a particular speaker can be deleted from the memory 104 or mass storage 106 when no longer needed. For example, when a particular speaker has not engaged in a remote session with the service application for a predetermined period of time, then the acoustic model corresponding to that speaker is deleted. Should the speaker initiate a remote session after deletion of the acoustic model corresponding to that speaker, the speaker-independent model is initially utilized and then modified according to newly acquired samples of the speaker's speech, as described above.

According to yet another embodiment of the present invention, rather than modifying an acoustic model across a plurality of remote sessions based upon speech of an individual speaker such that the model is speaker specific, the acoustic model can be modified based upon speech of a group of speakers such that the model is speaker-cluster specific. For example, speakers from different locales, each locale being associated with a corresponding accent (or lack thereof), can be clustered and a model or set of statistics can be stored corresponding to each cluster. Thus, speakers from Minnesota can be included in a cluster, while speakers from Georgia can be included in another cluster. As an example, when the remote connection is via telephone, the speaker's telephone area code can be used to place the speaker into an appropriate cluster. It will be apparent that clusters can be based upon criteria other than locale.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A method of adapting a speech recognition system, wherein the method comprises steps of:
   a. obtaining an identification of a speaker;
   b. obtaining a sample of a speaker's speech during a first remote session;
   c. recognizing the speaker's speech utilizing the speech recognition system during the first remote session;
   d. modifying the speech recognition system by incorporating the sample into the speech recognition system thereby forming a speaker-specific modified speech recognition system;
   e. storing a representation of the speaker-specific modified speech recognition system in association with the identification of the speaker; and
   f. using the representation of the speaker-specific modified speech recognition system to recognize speech during a subsequent remote session with the speaker.

2. The method according to claim 1 further comprising a step of cumulatively modifying the speech recognition system according to speech samples obtained during one or more remote sessions with the speaker.

3. The method according to claim 1 wherein the speaker is a telephone caller.

4. The method according to claim 1 wherein the step of modifying the speech recognition system comprises a step of modifying an acoustic model thereby forming a speaker-specific modified acoustic model and wherein the step of storing a representation of the speaker-specific modified speech recognition system comprises a step of storing a representation of the modified acoustic model.

5. The method according to claim 4 wherein the representation of the speaker-specific modified acoustic model is a set of statistics which can be utilized to modify a pre-existing acoustic model.

6. The method according to claim 4 wherein the representation of the speaker-specific modified acoustic model is a set of statistics which can be utilized to modify incoming acoustic speech.

7. The method according to claim 1 further comprising a step of utilizing the speaker-specific modified speech recognition system during the first remote session with the speaker.

8. The method according to claim 1 wherein the speech recognition system is speaker-independent prior to the first remote session.

9. The method according to claim 1 wherein the step of modifying the speech recognition system is performed during the first remote session.

10. The method according to claim 1 wherein the step of modifying the speech recognition system is performed after termination of the first remote session.

11. The method according to claim 1 further comprising a step of authenticating the speaker's identification by the speaker's speech.

12. The method according to claim 2 wherein the speech recognition system is speaker-independent prior to the first remote session.

13. The method according to claim 2 wherein the step of modifying the speech recognition system is performed during the first remote session.

14. The method according to claim 2 wherein the step of modifying the speech recognition system is performed after termination of the first remote session.

15. The method according to claim 2 further comprising a step of authenticating the speaker's identification by the speaker's speech.

16. A method of adapting a speech recognition system, wherein the method comprises steps of:
   a. obtaining an identification of a cluster of speakers;
   b. obtaining a sample of a speaker's speech during a first remote session;
   c. recognizing the speaker's speech utilizing the speech recognition system during the first remote session;
   d. modifying the speech recognition system by incorporating the sample into the speech recognition system thereby forming a cluster-specific modified speech recognition system;
   e. storing a representation of the cluster-specific modified speech recognition system in association with the identification of a cluster of speakers wherein the speaker is a member of the cluster; and
   f. using the representation of the cluster-specific modified speech recognition system to recognize speech during a subsequent remote session with a member of the cluster of speakers.

17. The method according to claim 16 further comprising a step of cumulatively modifying the speech recognizing system according to speech samples obtained during one or more remote sessions with one or more members of the cluster of speakers.

18. The method according to claim 16 wherein the speaker is a telephone caller.

19. The method according to claim 16 wherein the step of modifying the speech recognition system comprises a step of modifying an acoustic model thereby forming a cluster-specific modified acoustic model and wherein the step of storing a representation of the cluster-specific modified speech recognition system comprises a step of storing a representation of the cluster-specific modified acoustic model.

20. The method according to claim 19 wherein the representation of the cluster-specific modified acoustic model is a set of statistics which can be utilized to modify a pre-existing acoustic model.

21. The method according to claim 19 wherein the representation of the cluster-specific modified acoustic model is a set of statistics which can be utilized to modify incoming acoustic speech.

22. The method according to claim 16 further comprising a step of utilizing the cluster-specific modified speech recognition system during the first remote session with the speaker.

23. The method according to claim 16 wherein the speech recognition system is speaker-independent prior to the first remote session.

24. The method according to claim 16 wherein the step of modifying the speech recognition system is performed during the first remote session.

25. The method according to claim 16 wherein the step of modifying the speech recognition system is performed after termination of the first remote session.

26. The method according to claim 17 wherein the speech recognition system is speaker-independent prior to the first remote session.

27. The method according to claim 17 wherein the step of modifying the speech recognition system is performed during the first remote session.

28. The method according to claim 17 wherein the step of modifying the speech recognition system is performed after termination of the first remote session.

29. The method according to claim 17 further comprising a step of authenticating the speaker's identification by the speaker's speech.

30. A method of adapting a speech recognition system, wherein the method comprises steps of:
   a. obtaining an identification of each of a plurality of speakers during a corresponding first remote session with each speaker;
   b. obtaining a sample of speech made by each of the plurality of speakers during a corresponding first remote session with each speaker;
   c. recognizing speech made by each speaker during the corresponding first remote session utilizing the speech recognition system configured to be speaker-independent;
   d. modifying the speech recognition system by individually incorporating the sample from each speaker into the speech recognition system thereby forming a speaker-specific modified speech recognition system corresponding to each speaker;
   e. storing a representation of the speaker-specific modified speech recognition system corresponding to each speaker in association with the identification of the corresponding speaker; and
   f. using the representation of the speaker-specific modified speech recognition system corresponding to a speaker to recognize speech during a subsequent remote session with the speaker.

31. The method according to claim 30 further comprising a step of cumulatively modifying the speech recognition system for each speaker according to speech samples obtained during one or more remote sessions with the corresponding speaker.

32. The method according to claim 30 wherein each of the plurality of speakers is a telephone caller.

33. The method according to claim 30 wherein the step of modifying the speech recognition system comprises a step of modifying an acoustic model thereby forming a speaker-specific modified acoustic model corresponding to each speaker and wherein the step of storing a representation of the modified speech recognition system comprises a step of storing a representation of the modified acoustic model corresponding to each speaker.

34. The method according to claim 33 wherein the representation of the speaker-specific modified acoustic model corresponding to each speaker is a set of statistics which can be utilized to modify a pre-existing acoustic model.

35. The method according to claim 33 wherein the representation of the speaker-specific modified acoustic model corresponding to each speaker is a set of statistics which can be utilized to modify incoming acoustic speech.

36. The method according to claim 30 further comprising a step of utilizing the speaker-specific modified speech recognition system corresponding to each speaker during the first remote session with the corresponding speaker.

37. The method according to claim 30 wherein the step of modifying the speech recognition system for each speaker is performed during the first remote session with the corresponding speaker.

38. The method according to claim 30 wherein the step of modifying the speech recognition system for each speaker is performed after termination of the first remote session with the corresponding speaker.

39. The method according to claim 30 further comprising a step of authenticating each speaker's identification by the speaker's speech.

40. The method according to claim 31 wherein the step of modifying the speech recognition system for each speaker is performed during the first remote session with the corresponding speaker.

41. The method according to claim 31 wherein the step of modifying the speech recognition system for each speaker is performed after termination of the first remote session with the corresponding speaker.

42. The method according to claim 31 further comprising a step of authenticating each speaker's identification by the speaker's speech.

43. The method according to claim 30 further comprising a step of deleting the representation of the speaker-specific modified speech recognition system corresponding to a speaker.

44. The method according to claim 43 wherein the step of deleting the representation of the speaker-specific modified speech recognition system corresponding to a speaker is performed when a predetermined period of time has elapsed since the corresponding speaker last engaged in a remote session.

45. A speech recognition system comprising:
   a. an interface coupled to receive a remote session from a speaker; and
   b. a processing system coupled to the interface to obtain an identification of the speaker and to recognize the speaker's speech wherein the processing system is cumulatively modified by incorporating speech samples obtained during a plurality of remote sessions with the speaker into the speech recognition system, thereby forming a speaker-specific modified processing system associated with the identification of the speaker.

46. The speech recognition system according to claim 45 wherein the speaker is a telephone caller.

47. The speech recognition system according to claim 45 wherein the processing system is modified by modifying an acoustic model, thereby forming a speaker-specific acoustic model.

48. The speech recognition system according to claim 47 wherein the processing system includes a memory for storing the speaker-specific acoustic model in association with the identification of the telephone caller.

49. The speech recognition system according to claim 48 wherein the memory stores a plurality of speaker-specific acoustic models, one for each of a plurality of telephone callers and wherein each speaker-specific acoustic model is stored in association with the identification of the corresponding telephone caller.

50. The speech recognition system according to claim 49 wherein the selected ones of the plurality of speaker-specific acoustic models are deleted when a predetermined period of time has elapsed since the corresponding speaker last engaged in a remote session with the voice recognizer.

51. A method of adapting an acoustic model utilized for speech recognition, wherein the method comprises steps of:
   a. obtaining an identification of a speaker;
   b. obtaining a speech utterance from the speaker during a remote session;
   c. recognizing the speaker's speech utilizing an acoustic model during the remote session;
   d. making a determination relative to the speech utterance; and
   e. only when indicated by the determination, performing steps of:
      i. modifying the acoustic model by incorporating the speech utterance into the acoustic model thereby forming a speaker-specific modified acoustic model; and
      ii. storing a representation of the speaker-specific modified acoustic model in association with the identification of the speaker.

52. The method according to claim 51 wherein the step of making the determination assigns a confidence level to the speech utterance.

53. The method according to claim 51 wherein the step of making the determination assigns a confidence level to each of a plurality of portions of the speech utterance.

54. The method according to claim 51 wherein the step of making a determination determines a level of resources available for storing the representation of the speaker-specific modified acoustic model.

55. The method according to claim 51 wherein the step of making a determination determines a level of processing resources available for performing the step of modifying the acoustic model.

* * * * *

(12) EX PARTE REEXAMINATION CERTIFICATE (8881st)
United States Patent
Murveit et al.

(10) Number: US 6,766,295 C1
(45) Certificate Issued: Mar. 6, 2012

(54) ADAPTATION OF A SPEECH RECOGNITION SYSTEM ACROSS MULTIPLE REMOTE SESSIONS WITH A SPEAKER

(75) Inventors: Hy Murveit, Portola Valley, CA (US); Ashvin Kannan, Redwood City, CA (US)

(73) Assignee: USB AG, Stamford Branch, Stamford, CT (US)

Reexamination Request:
No. 90/011,126, Jul. 30, 2010

Reexamination Certificate for:
Patent No.: 6,766,295
Issued: Jul. 20, 2004
Appl. No.: 09/309,211
Filed: May 10, 1999

(51) Int. Cl.
*G10L 15/06* (2006.01)
*G10L 15/00* (2006.01)
*G10L 15/28* (2006.01)

(52) U.S. Cl. ............ 704/243; 379/88.01; 704/244; 704/E15.047

(58) Field of Classification Search .............. None
See application file for complete search history.

(56) References Cited

To view the complete listing of prior art documents cited during the proceeding for Reexamination Control Number 90/011,126, please refer to the USPTO's public Patent Application Information Retrieval (PAIR) system under the Display References tab.

*Primary Examiner* — Fred Ferris

(57) ABSTRACT

A technique for adaptation of a speech recognizing system across multiple remote communication sessions with a speaker. The speaker can be a telephone caller. An acoustic model is utilized for recognizing the speaker's speech. Upon initiation of a first remote session with the speaker, the acoustic model is speaker-independent. During the first session, the speaker is uniquely identified and speech samples are obtained from the speaker. In the preferred embodiment, the samples are obtained without requiring the speaker to engage in a training session. The acoustic model is then modified based upon the samples thereby forming a modified model. The model can be modified during the session or after the session is terminated. Upon termination of the session, the modified model is then stored in association with an identification of the speaker. During a subsequent remote session, the speaker is identified and, then, the modified acoustic model is utilized to recognize the speaker's speech. Additional speech samples are obtained during the subsequent session and, then, utilized to further modify the acoustic model. In this manner, an acoustic model utilized for recognizing the speech of a particular speaker is cumulatively modified according to speech samples obtained during multiple sessions with the speaker. As a result, the accuracy of the speech recognizing system improves for the speaker even when the speaker only engages in relatively short remote sessions.

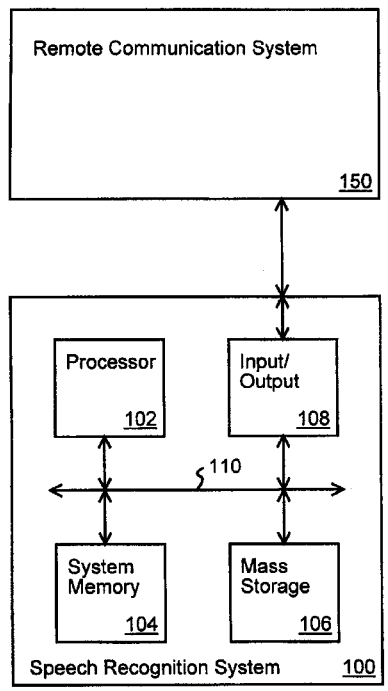

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-55 is confirmed.

New claims 56-154 are added and determined to be patentable.

56. *The method of claim 1, further comprising using the speech recognition system to service multiple users.*

57. *The method of claim 1, further comprising using the speech recognition system to service a diverse population of speakers.*

58. *The method of claim 1, further comprising using the speech recognition system to service speakers from multiple telephone area codes.*

59. *The method of claim 1, further comprising using the speech recognition system in a customer service application.*

60. *The method of claim 1, wherein the sample is obtained without prompting the speaker to speak predetermined words or phrases.*

61. *The method of claim 1, wherein the identification of the speaker comprises a name of the speaker.*

62. *The method of claim 1, wherein the identification of the speaker comprises a personal identification number.*

63. *The method of claim 1, wherein the identification of the speaker comprises an account number.*

64. *The method of claim 1, wherein the identification of the speaker comprises a telephone caller ID.*

65. *The method of claim 1, wherein obtaining the identification of the speaker comprises performing voice identification on the speaker's speech.*

66. *The method of claim 1, wherein obtaining the identification of the speaker comprises uniquely identifying the speaker.*

67. *The method of claim 1, wherein the identification of the speaker is obtained during the first remote session.*

68. *The method of claim 1, further comprising using the identification of the speaker to retrieve the representation of the speaker-specific modified speech recognition system for the subsequent remote session.*

69. *The method of claim 1, further comprising using the identification of the speaker to determine whether the speaker is a first-time speaker.*

70. *The method of claim 1, wherein incorporating the sample into the speech recognition system comprises modifying an acoustic model based on the sample.*

71. *The method of claim 1, wherein incorporating the sample into the speech recognition system comprises modifying an acoustic model by computing statistics based on the sample.*

72. *The method of claim 1, wherein incorporating the sample into the speech recognition system comprises computing, based on the sample, statistics that can be used to modify incoming acoustic speech.*

73. *The method of claim 1, wherein incorporating the sample into the speech recognition system comprises computing transform statistics for a pre-existing model.*

74. *The method of claim 1, wherein the representation of the speaker-specific modified speech recognition system comprises a modified acoustic model.*

75. *The method of claim 1, further comprising further modifying the speaker-specific modified speech recognition system based on speech obtained during the subsequent remote session.*

76. *The method of claim 1, further comprising deleting the representation of the speaker-specific modified speech recognition system when the speaker has not engaged in a remote session for a predetermined period of time.*

77. *The method of claim 16, wherein the cluster is defined based on telephone area code.*

78. *The method of claim 16, further comprising using the speech recognition system to service a diverse population of speakers.*

79. *The method of claim 16, further comprising using the speech recognition system to service speakers from multiple telephone area codes.*

80. *The method of claim 16, further comprising using the speech recognition system in a customer service application.*

81. *The method of claim 16, wherein the sample is obtained without prompting the speaker to speak predetermined words or phrases.*

82. *The method of claim 16, wherein incorporating the sample into the speech recognition system comprises modifying an acoustic model based on the sample.*

83. *The method of claim 16, wherein incorporating the sample into the speech recognition system comprises modifying an acoustic model by computing statistics based on the sample.*

84. *The method of claim 16, wherein incorporating the sample into the speech recognition system comprises computing, based on the sample, statistics that can be used to modify incoming acoustic speech.*

85. *The method of claim 16, wherein incorporating the sample into the speech recognition system comprises computing transform statistics for a pre-existing model.*

86. *The method of claim 16, wherein the representation of the cluster-specific modified speech recognition system comprises a modified acoustic model.*

87. *The method of claim 30, wherein the plurality of speakers comprises speakers from multiple telephone area codes.*

88. *The method of claim 30, further comprising using the speech recognition system in a customer service application.*

89. *The method of claim 30, wherein the sample is obtained without prompting the respective speaker to speak predetermined words or phrases.*

90. *The method of claim 30, wherein the identification of at least one speaker of the plurality of speakers comprises a name of the at least one speaker.*

91. *The method of claim 30, wherein the identification of at least one speaker of the plurality of speakers comprises a personal identification number.*

92. *The method of claim 30, wherein the identification of at least one speaker of the plurality of speakers comprises an account number.*

93. *The method of claim 30, wherein the identification of at least one speaker of the plurality of speakers comprises a telephone caller ID.*

94. *The method of claim 30, wherein obtaining the identification of at least one speaker of the plurality of speakers comprises performing voice identification on the at least one speaker's speech.*

95. The method of claim 30, wherein obtaining the identification of at least one speaker of the plurality of speakers comprises uniquely identifying the at least one speaker from among the plurality of speakers.

96. The method of claim 30, further comprising using the identification of a first speaker of the plurality of speakers to retrieve the representation of the speaker-specific modified speech recognition system for the first speaker for the subsequent remote session.

97. The method of claim 30, further comprising using the identification of at least one speaker of the plurality of speakers to determine whether the at least one speaker is a first-time speaker.

98. The method of claim 30, wherein individually incorporating the sample from each speaker into the speech recognition system comprises modifying an acoustic model based on the sample.

99. The method of claim 30, wherein individually incorporating the sample from each speaker into the speech recognition system comprises modifying an acoustic model by computing statistics based on the sample.

100. The method of claim 30, wherein individually incorporating the sample from each speaker into the speech recognition system comprises computing, based on the sample, statistics that can be used to modify incoming acoustic speech.

101. The method of claim 30, wherein individually incorporating the sample from each speaker into the speech recognition system comprises computing transform statistics for a pre-existing model.

102. The method of claim 30, wherein the representation of the speaker-specific modified speech recognition system comprises a modified acoustic model.

103. The method of claim 30, further comprising deleting the representation of the speaker-specific modified speech recognition system corresponding to a first speaker of the plurality of speakers when the first speaker has not engaged in a remote session for a predetermined period of time.

104. The speech recognition system of claim 49, wherein the processing system is configured to delete selected ones of the plurality of speaker-specific acoustic models when a predetermined period of time has elapsed since the corresponding telephone caller last engaged in a remote session.

105. The speech recognition system of claim 45, wherein the processing system is configured to authenticate the speaker's identification by the speaker's speech.

106. The speech recognition system of claim 45, wherein the interface is configured to service a diverse population of speakers.

107. The speech recognition system of claim 45, wherein the interface is configured to service speakers from multiple telephone area codes.

108. The speech recognition system of claim 45, wherein the speech recognition system is configured to be used in a customer service application.

109. The speech recognition system of claim 45, wherein the processing system is configured to obtain the speech samples without prompting the speaker to speak predetermined words or phrases.

110. The speech recognition system of claim 45, wherein the identification of the speaker comprises a name of the speaker.

111. The speech recognition system of claim 45, wherein the identification of the speaker comprises a personal identification number.

112. The speech recognition system of claim 45, wherein the identification of the speaker comprises an account number.

113. The speech recognition system of claim 45, wherein the identification of the speaker comprises a telephone caller ID.

114. The speech recognition system of claim 45, wherein the processing system is configured to obtain the identification of the speaker by performing voice identification on the speaker's speech.

115. The speech recognition system of claim 45, wherein the processing system is configured to obtain the identification of the speaker by uniquely identifying the speaker.

116. The speech recognition system of claim 45, wherein the processing system is configured to use the identification of the speaker to distinguish the speaker from other speakers.

117. The speech recognition system of claim 45, wherein the processing system is configured to use the identification of the speaker to retrieve the speaker-specific modified processing system during the plurality of remote sessions.

118. The speech recognition system of claim 45, wherein the processing system is configured to use the identification of the speaker to determine whether the speaker is a first-time speaker.

119. The speech recognition system of claim 45, wherein the processing system is configured to recognize the speaker's speech during a remote session with the speaker.

120. The speech recognition system of claim 45, wherein incorporating the speech samples into the speech recognition system comprises modifying an acoustic model based on the speech samples.

121. The speech recognition system of claim 45, wherein incorporating the speech samples into the speech recognition system comprises modifying an acoustic model by computing statistics based on the speech samples.

122. The speech recognition system of claim 45, wherein incorporating the speech samples into the speech recognition system comprises computing, based on the speech samples, statistics that can be used to modify incoming acoustic speech.

123. The speech recognition system of claim 45, wherein incorporating the speech samples into the speech recognition system comprises computing transform statistics for a pre-existing model.

124. The speech recognition system of claim 45, wherein the speaker-specific modified processing system comprises a modified acoustic model.

125. The method of claim 51, wherein the step (e) comprises only performing the steps (i) and (ii) when a confidence level of speech recognition performed on the sample is above a threshold.

126. The method of claim 51, wherein the step (e) comprises only performing the steps (i) and (ii) when a confidence level of speech recognition performed on the sample is below a threshold.

127. The method of claim 51, wherein the step (e) comprises only performing the steps (i) and (ii) when a level of available memory and/or available processing power is above a threshold.

128. The method of claim 51, further comprising using the acoustic model in a speech recognition system that services multiple users.

129. The method of claim 51, further comprising using the acoustic model in a speech recognition system that services a diverse population of speakers.

130. The method of claim 51, further comprising using the acoustic model in a speech recognition system that services speakers from multiple telephone area codes.

131. The method of claim 51, further comprising using the acoustic model in a customer service application.

132. The method of claim 51, wherein the speech utterance is obtained without prompting the speaker to speak predetermined words or phrases.

133. The method of claim 51, wherein the identification of the speaker comprises a name of the speaker.

134. The method of claim 51, wherein the identification of the speaker comprises a personal identification number.

135. The method of claim 51, wherein the identification of the speaker comprises an account number.

136. The method of claim 51, wherein the identification of the speaker comprises a telephone caller ID.

137. The method of claim 51, wherein obtaining the identification of the speaker comprises performing voice identification on the speaker's speech.

138. The method of claim 51, wherein obtaining the identification of the speaker comprises uniquely identifying the speaker.

139. The method of claim 51, wherein obtaining the identification of the speaker comprises distinguishing the speaker from other speakers.

140. The method of claim 51, wherein the identification of the speaker is obtained during the remote session.

141. The method of claim 51, further comprising using the identification of the speaker to retrieve the representation of the speaker-specific modified acoustic model for a subsequent remote session with the speaker.

142. The method of claim 51, further comprising using the identification of the speaker to determine whether the speaker is a first-time speaker.

143. The method of claim 51, wherein incorporating the speech utterance into the acoustic model comprises modifying the acoustic model by computing statistics based on the speech utterance.

144. The method of claim 51, wherein incorporating the speech utterance into the acoustic model comprises computing, based on the speech utterance, statistics that can be used to modify incoming acoustic speech.

145. The method of claim 51, wherein incorporating the speech utterance into the acoustic model comprises computing transform statistics for the acoustic model.

146. The method of claim 51, further comprising further modifying the speaker-specific modified acoustic model based on speech obtained during a subsequent remote session with the speaker.

147. The method of claim 51, further comprising deleting the representation of the speaker-specific modified acoustic model when the speaker has not engaged in a remote session for a predetermined period of time.

148. The method of claim 51, further comprising cumulatively modifying the acoustic model according to speech samples obtained during one or more remote sessions with the speaker.

149. The method of claim 51, wherein the speaker is a telephone caller.

150. The method of claim 51, further comprising utilizing the speaker-specific modified acoustic model during the remote session.

151. The method of claim 51, wherein the acoustic model is speaker-independent prior to the remote session.

152. The method of claim 51, wherein the step of modifying the acoustic model is performed during the remote session.

153. The method of claim 51, wherein the step of modifying the acoustic model is performed after termination of the remote session.

154. The method of claim 51, further comprising authenticating the speaker's identification by the speaker's speech.

\* \* \* \* \*